United States Patent [19]

Kejha

[11] Patent Number: 5,597,658
[45] Date of Patent: Jan. 28, 1997

[54] ROLLED SINGLE CELL AND BI-CELL ELECTROCHEMICAL DEVICES AND METHOD OF MANUFACTURING THE SAME

[76] Inventor: Joseph B. Kejha, c/o Hope Technologies, Inc. 3701 Welsh Rd., Willow Grove, Pa. 19090-1293

[21] Appl. No.: 395,717

[22] Filed: Feb. 28, 1995

[51] Int. Cl.⁶ ............................................. H01M 10/40
[52] U.S. Cl. ...................... 429/94; 429/189; 429/190; 427/121; 427/394; 29/623.5
[58] Field of Search .................... 429/99, 189, 190; 427/393.3, 394, 412, 121; 29/623.5

[56] References Cited

U.S. PATENT DOCUMENTS

| | | | |
|---|---|---|---|
| 4,419,209 | 12/1983 | Klinkowski | 204/296 |
| 4,698,110 | 10/1987 | Vassiliou | 427/394 |
| 4,879,190 | 11/1989 | Lundsgaard | 429/192 |
| 5,001,023 | 3/1991 | Cheshire et al. | 429/94 |
| 5,009,927 | 4/1991 | Cloyd et al. | 427/121 |
| 5,271,968 | 12/1993 | Coyle et al. | 427/393.5 |

*Primary Examiner*—Stephen Kalafut
*Attorney, Agent, or Firm*—Zachary T. Wobensmith, III

[57] ABSTRACT

Rolled single cell and bi-cell electrochemical devices and method of manufacturing, wherein the anode, cathode and composite electrolyte layers are separately fed and simultaneously rolled while the composite polymer electrolyte layer is wet or semi-solid, and may be possibly solidified later.

10 Claims, 3 Drawing Sheets

5,597,658

ROLLED SINGLE CELL AND BI-CELL ELECTROCHEMICAL DEVICES AND METHOD OF MANUFACTURING THE SAME

BACKGROUND OF THE INVENTION

1. Field of the Invention

This invention is directed to rolled single cell and bi-cell electrochemical devices and method of manufacturing, which devices are of rolled layered construction with each separate layer individually fed and simultaneously rolled while the composite polymer electrolyte layer is wet.

2. Description of the Prior Art

There are many advantages to rolled electrochemical devices such as batteries, which consist of layers of anode, cathode and electrolyte rolled about a core. Such devices possess greater power density than many other batteries due to their high surface area. Rolled batteries are difficult to manufacture by conventional methods where typically the anode, cathode and electrolyte layers are first formed into a stack and then rolled about a core. The layers tend to bunch up, crease, separate, require high energy to roll the composite and do not produce a satisfactory product. It is desirable to be able to produce a rolled device where the electrolyte composite is solid or semi-solid, which is even more difficult than rolling a stack of layers with a liquid electrolyte in a membrane. The use of liquid electrolyte also causes safety and other problems due to the difficulty of adequately sealing the devices. Such rolled electrochemical devices would include batteries, capacitors, and fuel cells.

The described electrochemical devices and their method of manufacture do not suffer from the prior art problems and provide many positive advantages.

SUMMARY OF THE INVENTION

It has now been found that rolled single cell and bi-cell devices such as polymer electrolyte batteries, can be manufactured by feeding the anode, cathode and electrolyte layers separately, and rolling the layers simultaneously about a core while the composite polymer electrolyte is wet, which produces batteries that have increased power density, and are easy to manufacture at reduced cost, which method of manufacture is suitable for mass production and provides numerous other benefits.

The principal object of the invention is to provide rolled single cell and bi-cell electrochemical devices such as polymer electrolyte batteries, capacitors, and fuel cells, and a method of manufacture where the devices have increased power density, are easy to manufacture and require less materials.

A further object of the invention is to provide devices which are fire resistant.

A further object of the invention is to provide devices and method as aforesaid that are suitable for mass production.

A further object of the invention is to provide devices and method as aforesaid where the devices are simple and inexpensive to construct, and long lasting in use.

A further object of the invention is to provide devices and method as aforesaid which use less materials.

Other objects and advantageous features of the invention will become apparent from the description and claims.

DESCRIPTION OF THE DRAWINGS

The nature and characteristic features of the invention will be more readily understood from the following description taken in connection with the accompanying drawings forming part hereof in which.

It should, of course, be understood that the description and drawings, herein are merely illustrative and that various modifications and changes can be made in the structures disclosed without departing from the spirit of the invention.

Like numbers refer to like parts throughout the several views.

DESCRIPTION OF THE PREFERRED EMBODIMENTS

When referring to the preferred embodiments, certain terminology will be utilized for the sake of clarity. Use of such terminology is intended to encompass not only the described embodiment, but also technical equivalents which operate and function in substantially the same way to bring about the same result.

Figure 1:
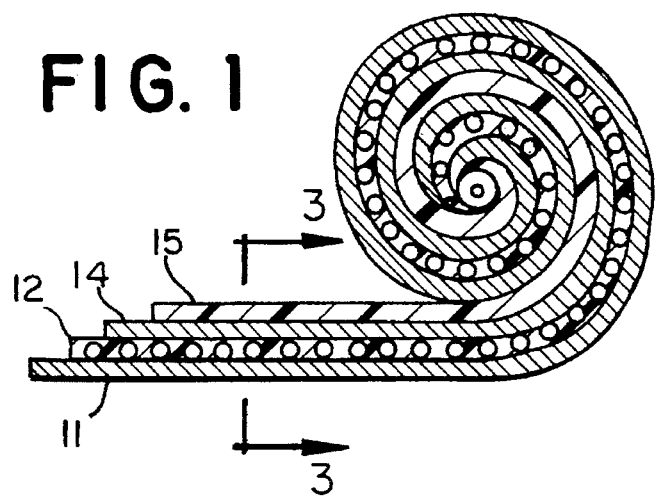
FIG. 1 is a diagrammatic view of one embodiment of a single cell battery constructed in accordance with the method of the invention, in partially unwound form.
Figure 3:
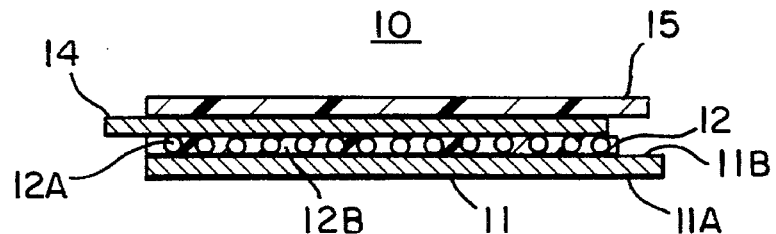
FIG. 3 is a vertical sectional view taken approximately on the line 3—3 of FIG. 1.
Figure 4:
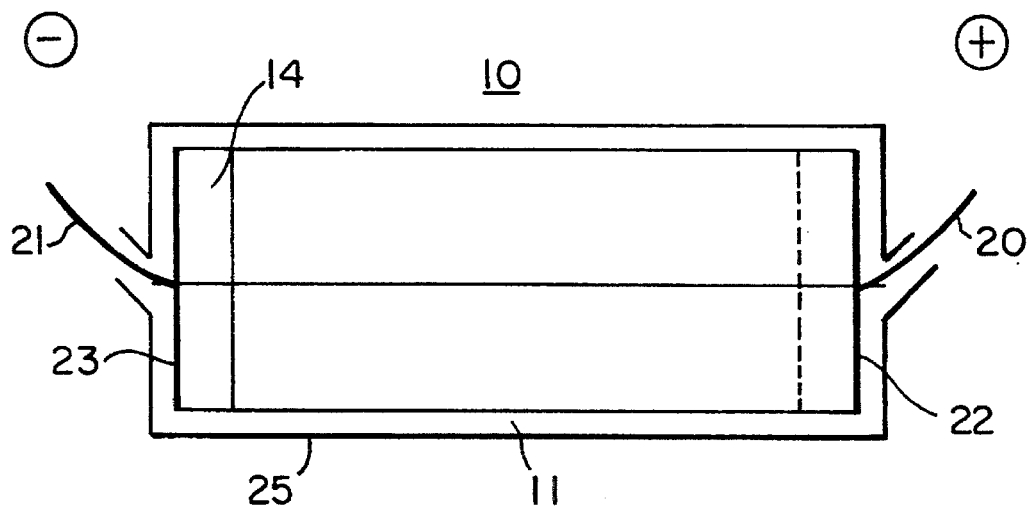
FIG. 4 is a side elevational view of a completed battery of the invention.
Figure 5:
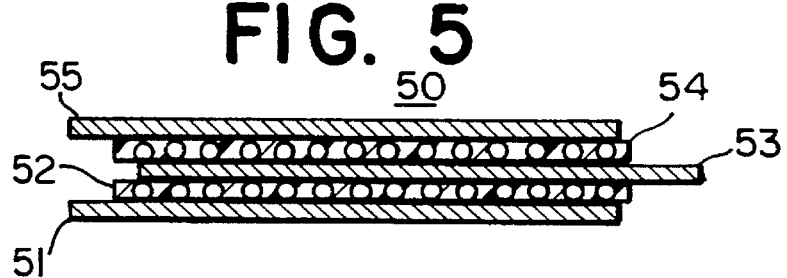
FIG. 5 is a view similar to FIG. 3 but of a bi-cell battery constructed in accordance with the method of the invention.

Referring now more particularly to the drawings and FIGS. 1, 3 and 4, a single cell battery 10 is illustrated. The battery 10 has a cathode or positive layer 11, a composite polymer electrolyte layer 12, an anode or negative layer 14, and a separator layer 15. The battery 10 as illustrated is of the lithium metal-polymer type, but other alkali metal or alkaline earth metal, or other types of batteries can be manufactured if desired.

The cathode 11 includes a current collector and carrier portion 11A, which can have a coating 1lb thereon of well known cathodic material. The current collector and carrier 11A can be of metal foil, or expanded or perforated metallized plastic film, or metallized fabric as described in my prior patent application Ser. No. 08/281,011 filed Jul. 27, 1994, or it can be a carbon fiber net such as described in U.S. Pat. No. 4,960,655. The materials must be compatible with the battery components, and support the specific current collecting and carrying capabilities required. The cathode coating material 11B may include finely ground particles of an intercalation compound, such as vanadium oxide compound ($V_6O_{13}$), or lithidated oxide such as manganese oxide ($LiMn_2O_4$ spinel) compound mixed with an organic solvent, polymer, alkali salt and carbon black. The composite polymer electrolyte layer 12 may include an electrically non-conductive ribbon net 12A of expanded or perforated plastic film material, which is inert to the battery components and is preferably of polypropylene, but other materials such as polyethylene, polyester, ethylenetetrafluoroethylene, polyetetrafluoroethylene, polyvinylchloride, and their variations are also suitable as described in U.S. Pat. No. 5,521,023. The ribbon 12A may also be of a fibrous electrically nonconductive material such as described in U.S. Pat. No. 5,102,752. The ribbon 12A is embedded in a layer 12B of solid or semi-solid state polymeric electrolyte, such as polyethylene oxide, compounded with a lithium salt and an ionically conductive liquid.

The anode 14 may be an alkali metal foil, or alkali metal alloy foil, or a lithiated or pure carbon compound coated on a metallized expanded plastic film, as desired, such as described in my prior U.S. patent application Ser. No. 08/281,011 filed Jul. 27, 1994, or an expanded metal foil, or a carbon fiber net as described in U.S. Pat. No. 4,960,655. The separator 15 may be of any suitable material, with an inert plastic tape such as Teflon, Mylar, or polypropylene and preferably with an anhydrous adhesive as described in U.S. Pat. No. 5,066,554 which is particularly suitable.

The battery cell 10 as shown in FIG. 4 may include positive and negative conductors 20 and 21 with end plates 22 and 23. The battery 10 may be preferably contained in a moisture-proof, plastic-coated metal foil bag (not shown) which is heat sealed and placed in a hard case 25.

Referring now more particularly to FIGS. 5–8 inclusive, a bi-cell battery 50 of multi-layered construction is therein illustrated. The bi-cell battery 50 has a first cathode layer 51, a first composite polymer electrolyte layer 52, an anode layer 53, a second composite polymer electrolyte layer 54, and a second cathode layer 55. The first and second cathode layers 51 and 55 may be of the same construction as cathode layer 11 of battery 10. The first and second composite polymer electrolyte layers 52 and 54 may be of the same construction as the electrolyte layer 12 of battery 10, and the anode layer 53 may be of the same construction as anode layer 14 of battery 10.

Figure 8:
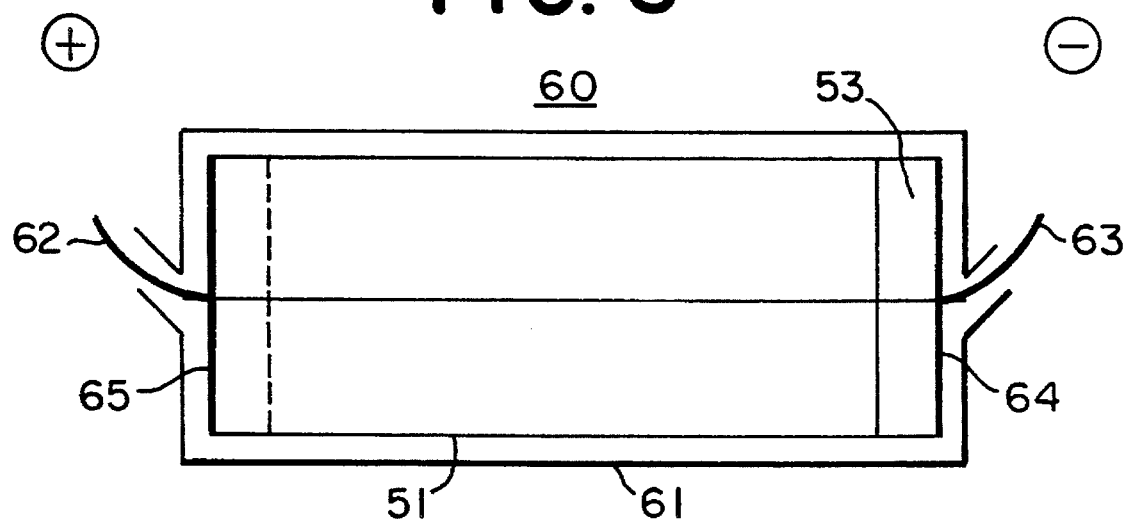
FIG. 8 is a side elevational view of a completed bi-cell battery.

The completed bi-cell battery 60 is illustrated in FIG. 8, constructed as described above, and is preferably contained in a hard plastic case 61, which may also be of metal if desired. The battery 60 may have a positive terminal 62, a negative terminal 63, with end plates 64 and 65.

The battery 60 prior to packaging in the case 61 may have the terminals 62 and 63 attached thereto, and may be placed in a moisture proof plastic coated metal foil bag (not shown), which is heat sealed, and then may be placed in the hard case 61.

Figure 2:
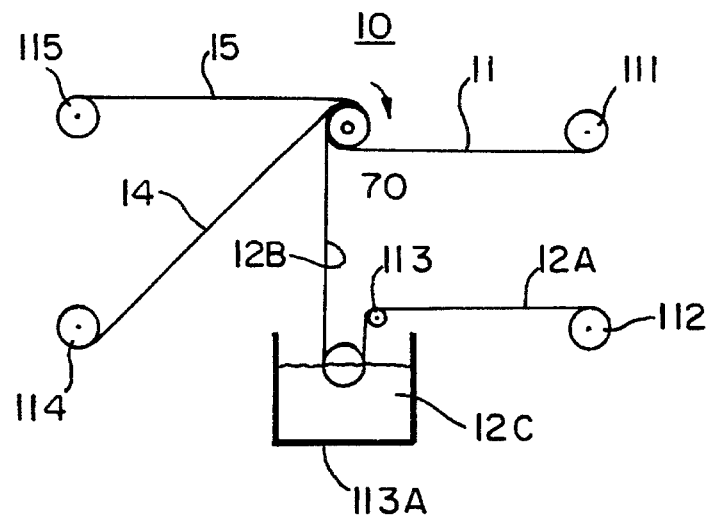
FIG. 2 is a diagrammatic view of the manufacturing of the battery of FIG. 1.

Referring now specifically to FIG. 2, starting at the right and going clockwise, the method of manufacturing the single cell battery 10 is illustrated. A roll 111 of cathode material 11 is shown, with a roll 112 of electrolyte ribbon 12A of well known type adjacent thereto, which extends over a roller 113 into a tank 113A of liquid electrolyte 12C which impregnates and coats the ribbon 12A with a layer 12B of wet electrolyte. A roll 114 of anode material 14 is provided adjacent roll 112. A roll 115 of separator material 15 is provided to the left of roll 114. In operation, the layers 11, 12 14 and 15 are fed separately, and simultaneously rolled about a core 70 as shown in FIGS. 1 and 2 with the electrolyte layer 12B still wet. The core 70 is rotated clockwise further unrolling the rolls 111, 112, 114 and 115 with electrolyte ribbon 12A carried through the tank 113A, which impregnates and coats the ribbon 12A with liquid electrolyte, which is rolled between layers 11 and 14. While the electrolyte is wet or semisolid when the battery is manufactured, it may be solidified after rolling by well known methods.

Figure 6:
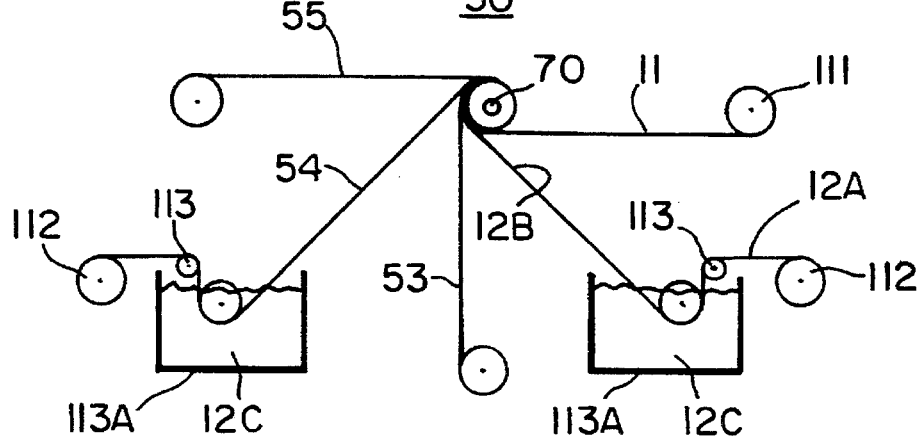
FIG. 6 is a diagrammatic view of the manufacturing of a bi-cell battery.
Figure 7:
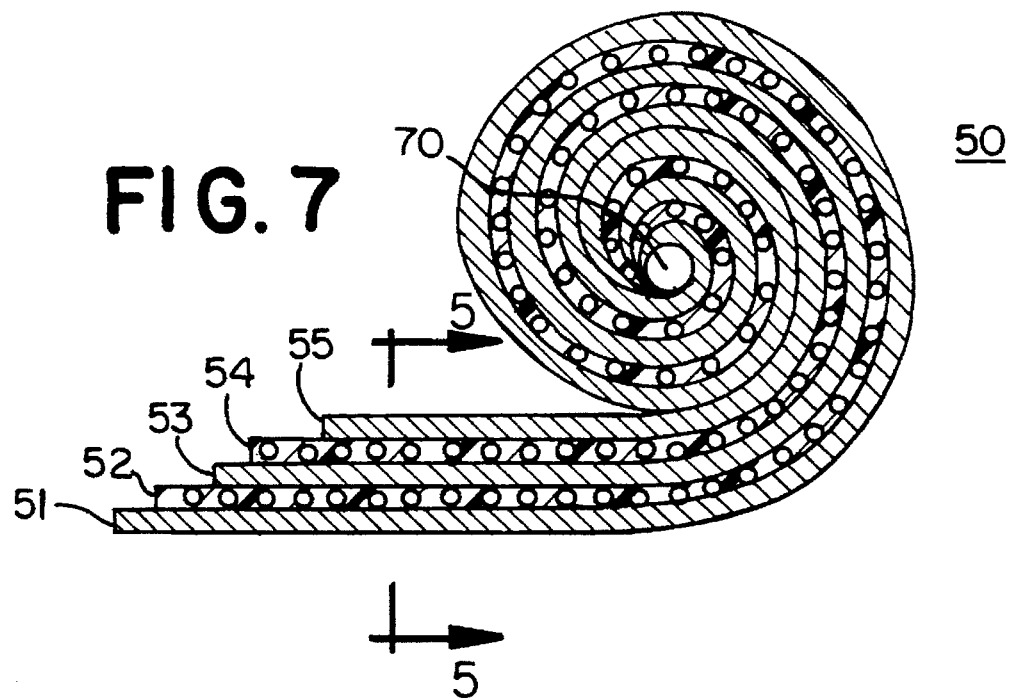
FIG. 7 is a view similar to FIG. 1, illustrating a bi-cell battery in partially unwound form.

Referring now additionally to FIG. 6, the method of manufacturing a rolled bi-cell battery 50 is therein illustrated which is similar to the method described for FIG. 2 except that there is an additional cathode layer 55 and an additional composite polymer electrolyte layer 54, which are also introduced separately onto a single anode layer 53 and all the layers are rolled simultaneously while the composite polymer electrolytes are wet or semi-solid when the bi-cell is manufactured, and may be solidified after rolling.

This bi-cell lithium polymer battery construction also improves the safety of the battery due to sealing the anode by use of composite polymer electrolyte layers between two non-flammable cathodes. The energy density of a bi-cell battery is also higher than single cell batteries, as there is no need for a separator layer, and also because only one current collector need be used for the common anode.

Similarly, additional layers may be inserted or added to form a bi-polar battery. The described methods are also suitable for the manufacture of capacitors and fuel cells. The advantage of this method is that it is easy to assemble large surface areas of thin, chemically active layers with minimum components resulting in high power and energy density when lithium systems are used.

The electrochemical devices, and especially lithium polymer battery bi-cells, may be manufactured to any desired large size for use in electric vehicles, where each cell may have large current density and capacity, and several 3 to 4 volt cells may be electrically connected in series to obtain 100 or more volts as desired for high power and energy density.

Accordingly, apparatus and method have been described with which the objects of the invention are achieved.

I claim:

1. A rolled cell electrochemical device which comprises:
   at least one cathode layer,
   at least one composite polymer electrolyte layer in contact with said cathode layer,
   an anode layer in contact with said composite polymer electrolyte layer,
   said cell has positive and negative terminals thereon, and
   wherein said electrolyte is wet or semi-solid during rolling and may be solidified after rolling.
2. A device as defined in claim 1 in which
   a separator layer is provided in contact with said anode layer.
3. A device as defined in claim 2 in which
   said separator layer is in adhesive contact with said anode layer.
4. A device as defined in claim 1 in which
   a moisture proof plastic coated heat sealable metal foil bag is provided surrounding said rolled electrochemical device.
5. A device as defined in claim 4 in which
   a hard case is provided enclosing said bag.
6. A method of manufacturing rolled cell electrochemical devices which comprises
   providing a core about which said device is to be formed,
   providing at least one supply of cathode layer material,
   providing at least one supply of electrolyte layer web material, providing at least one supply of anode layer material, providing a supply of liquid polymer electrolyte, impregnating and coating said electrolyte web material with said liquid polymer electrolyte to provide a composite polymer electrolyte layer, placing said composite polymer electrolyte layer between said cathode and said anode layers, feeding said layers separately, and simultaneously rolling said layers about said core while said electrolyte is wet or semi-solid to form a rolled electrochemical device.

7. A method as defined in claim 6 in which said electrolyte is solidified after rolling.

8. A bi-polar cell formed in accordance with the method defined in claim 6.

9. A capacitor formed in accordance with the method defined in claim 6.

10. A fuel cell formed in accordance with the method defined in claim 6.

\* \* \* \* \*